Feb. 16, 1971    R. K. BRAMLEY ET AL    3,563,011
MOWER MACHINE

Filed April 21, 1969    3 Sheets-Sheet 1

INVENTORS
ROBERT K. BRAMLEY,
& HUGH A. BOURASSA
BY
McNENNY, FARRINGTON,
PEARNE & GORDON
ATTORNEYS

INVENTORS
ROBERT K. BRAMLEY,
& HUGH A. BOURASSA
BY
McNENNY, FARRINGTON, PEARNE & GORDON
ATTORNEYS

000# United States Patent Office 3,563,011
Patented Feb. 16, 1971

3,563,011
MOWER MACHINE
Robert K. Bramley, Cleveland, and Hugh A. Bourassa, University Heights, Ohio, assignors to Kearney-National Inc., New York, N.Y., a corporation of Delaware
Continuation-in-part of application Ser. No. 705,395, Feb. 14, 1968. This application Apr. 21, 1969, Ser. No. 818,002
Int. Cl. A01d 75/30
U.S. Cl. 56—7                                              13 Claims

ABSTRACT OF THE DISCLOSURE

A hydraulic control system for a multiple unit mowing machine is disclosed. Each mower unit is independently retractable and individually driven through a flexible cable drive. Hydraulic mower clutches are separately connected to an actuator control circuit to be automatically disengaged when their associated mowers are retracted. The mower clutches are also operable to slip to allow the associated flexible cable to stop with the mower when a mower unit becomes obstructed. An intergral implement circuit of the mowing machine transmission is utilized to drive hydraulic actuators which individually positions several mowing units. Novel and improved valve and circuit means are provided to retract and hydraulically lock each mower actuator. Outboard mowing units are yieldably extended under the pressure of an accumulator connected to associated bidirectional actuators.

CROSS REFERENCES TO RELATED APPLICATIONS

This application is a continuation-in-part of our co-pending application, Ser. No. 705,395, filed Feb. 14, 1968.

BACKGROUND OF THE INVENTION

This invention relates to an integrated control and drive system adapted for use with the wide swath multiple unit mowing machine disclosed in our copending application, Ser. No. 705,395. The mower units of the machine are individually retractable to facilitate its transport and to provide access to confined areas. Hydraulic control of each mower's lift, reel drive, and suspension is provided with a single control.

DESCRIPTION OF THE PRIOR ART

In the past, multiple unit mowing machines have usually been provided as either attachments for relatively large tractors or as smaller single purposes mowing vehicles. Attachment units were, in effect, built around existing tractors and consequently compromised mower efficiency and versatility. The design of power systems for lifting, suspending, and driving individual mowers usually depended upon a particular tractor's power take-off provisions necessitating much duplication and inefficiency.

The usually smaller single purpose mowing tractors, while normally more maneuverable than a larger garden or farm tractor, have commonly been limited in both cutting width and mower retractability. The provision, much less the integration, of independent mower suspension, reel drive, and power lift have heretofore been uncommon on single purpose mowing vehicles.

Accordingly, we have shown in our copending application, cited above, a novel and improved self-propelled mowing machine having an engine adapted to drive the vehicle and the reels of five mowing units. The mowing units have been independently mounted for terrain following movement and for retraction into a narrower machine profile. As shown, therein, each mower unit is individually driven with a flexible cable and individually positioned with a hydraulic actuator.

SUMMARY OF THE INVENTION

A control and drive system particularly adapted for a multiple unit mowing machine is disclosed. Five mowers symmetrically arranged about the longitudinal centerline of the vehicle, are driven through flexible cables. Each mower is pivotally mounted to permit terrain following motion. The mowers may be retracted from extended mowing positions individually by means of hydraulic actuator cylinders. Hydraulically operated mower clutches between the vehicle's engine and each mower drive cable are arranged to disengage whenever an associated hydraulic cylinder is pressurized. The same clutch units are designed to slip whenever an associated reel is obstructed. Two outboard mower units are extended and supported in their extended position by associated hydraulic actuators and a hydraulic accumulator. The accumulator system allows these outboard units to yield rearwardly if they encounter an obstacle during mowing operations.

One aspect of this invention is the provision of a clutch assembly for each mower unit responsive to pressurization of an associated mower actuator to automatically disengage such clutch while the mower unit is retracted thereby simplifying operator control.

Another important aspect of this invention is the utilization of the same clutch assembly providing automatic disengagement during retraction to provide overload protection for the associated drive cable.

A further aspect of this invention is the provision of a valve assembly to selectively control individual mower actuator cylinders which is also particularly suited for use with an implement circuit of the vehicle's hydraulic transmission.

An additional aspect of this invention is the use of novel and improved spool valves of the control valve assembly which automatically hydraulically lock their associated actuator cylinders in their retracted positions.

A further aspect of this invention is the provision of an accumulator system which is operable to yieldably extend the outboard mowing units of the vehicle. This protects such units from damage in the event of an encounter with an obstacle during mowing operations.

Another aspect of this invention is the provision of this accumulator which also allows the use of identical control valves to drive both horizontal bidirection actuators and unidirectional lifting actuators.

Further aspect of this invention is the use of a relief valve means to automatically replenish hydraulic fluid lost from the accumulator system.

DESCRIPTION OF THE PREFERRED EMBODIMENT

Figure 1:
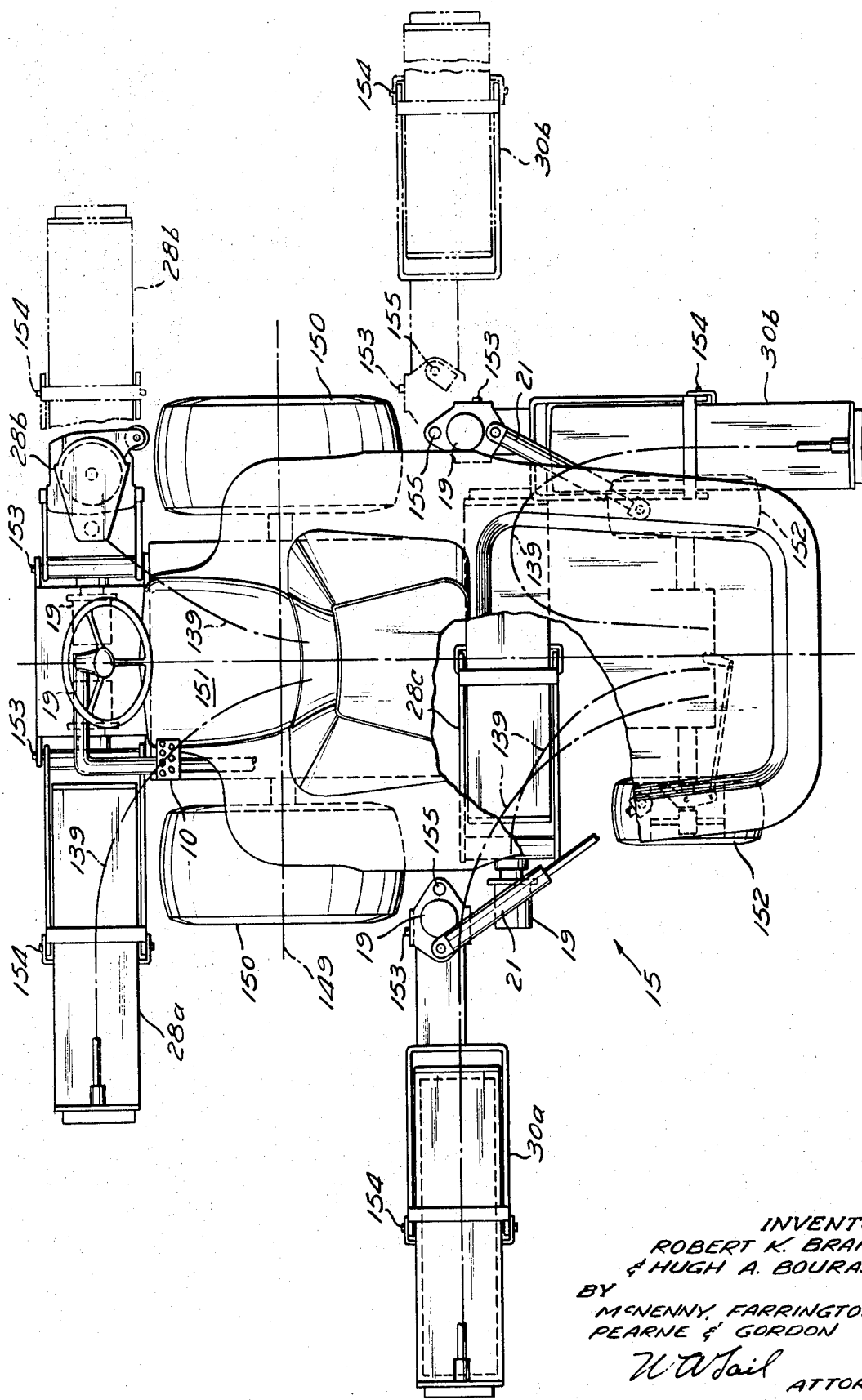
FIG. 1 is a plan view of the mowing machine incorporating this invention, illustrating the arrangement of its five mower units. The right hand units are shown in their retracted positions with their corresponding extended operating positions indicated with phantom lines.

The mowing machine of this invention comprises a tractor-like vehicle having five retractable reel mowing units. The general arrangement of the mower incorporating this invention is shown in FIG. 1. Five mowing units 28a, 28b, 28c, 30a and 30b are positioned substantially equidistant from the fixed front axle centerline 149 of the vehicle 15. This geometrical arrangement of the mowers about the non-steerable front wheels 150 minimizes the amount of overlap required between mowers to prevent skipping when the vehicle 15 is turned. An unobstructed view for the operator is provided by positioning the seat 151 over the front axle 149. The location of the front drive wheels 150 and steerable rear wheels 152 behind the mower units 28 insures that grass will be cut before it is ridden over.

Each mower unit is individually driven by a flexible cable 139 indicated by their centerlines. The flexible cables 139 provide a continuous and positive drive to each mower unit as it moves vertically and tilts about a pair of horizontal pivots 153 and 154, respectively, to follow the contour of the area being mowed. Furthermore, the flexible drive arrangement permits each unit to be pivoted from its mowing position to a retracted position without the necessity of disconnecting any drive shafts or the like. The right hand mower units 28b and 30b are shown in their retracted positions while their extended positions are shown in phantom.

Individual power means are provided for retracting each mower unit when the vehicle 15 is to be used in a confined mowing area or when it is to be transported. Power retraction of these mower units is provided by separate hydraulic lifting actuators or motors 19 which include integral springs (see FIG. 4) which counterbalance most of the weight of the mowers when in their mowing positions. Spring counterbalancing improves mowing quality by allowing the mower units 28, 30 to float more readily with the terrain and minimizes the sidewise scrubbing effect of the mowers when the vehicle 15 is turned. For a more complete description of the vehicle configuration and structural detail reference may be made to our copending application, Ser. No. 705,395, filed Feb. 14, 1968.

The two outboard mowing units 30a, 30b in addition to their horizontal pivots 153, 154 are provided with a vertical pivot 155 which allows these units to retract rearwardly. The hydraulic actuators or motors 21 are adapted to extend the outboard units 30 about these pivots 155 to their operating positions and allow them to yield rearwardly in the event they encounter an obstacle.

Figure 2:
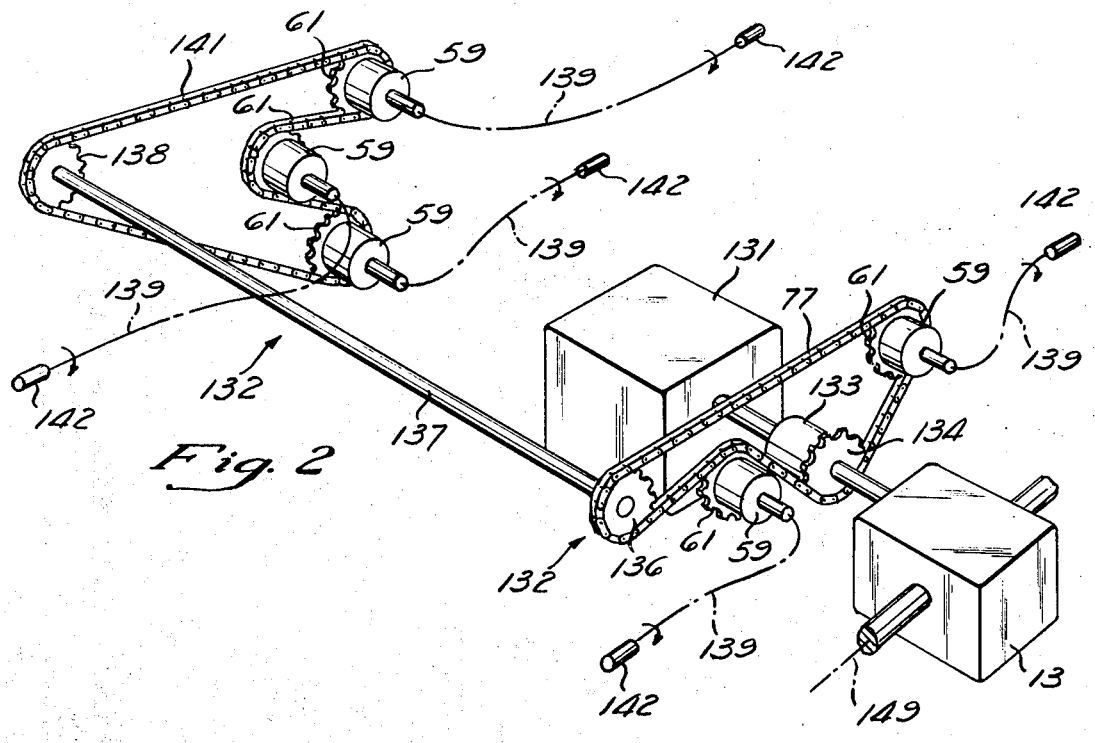
FIG. 2 is a schematic perspective view of the mower drive system showing the arrangement of the engine, hydraulic transmission, and individual mower clutches of the vehicle.

FIG. 2 schematically shows the arrangement of the vehicle and mower drives. An engine 131 drives both the variable speed hydraulic transmission 13 at the front of the vehicle, and the cable drive system 132 through a centrifugal clutch 133. The centrifugal clutch 133 permits the engine 131 to be started and idled without driving the transmission 13 or the reel drive system 132. The cable drive system 132 includes an input sprocket 134 which is driven through the centrifugal clutch 133 after the engine 131 reaches a predetermined minimum speed. This sprocket 134 drives a roller chain 77 connected to the clutch input sprocket 61 of the clutches 59 of the two front mowers 28a and 28b and a sprocket 136 on the auxiliary drive shaft 137. The drive shaft 137 extends to the rear of the vehicle where three clutches 59 are mounted on a suitable plate (not shown) of the vehicle 15. A sprocket 138 and chain 141 on the rear of the auxiliary drive shaft 137 is provided to drive the input sprockets 61 of these clutches 59 which drive two outboard mowers 30a and 30b and the middle mower 28c. The front and rear roller chains 77, 141 are arranged around the clutch sprockets 61 to drive all five mowers in the same direction as indicated by arrows on the input shafts 142 of each mower. The flexible cables 139 are again schematically represented by curved centerlines.

As shown in FIG. 2, a clutch 59 provides the input for each flexible drive cable 139. Each clutch 59 is designed to protect its driven cable 139 in the event that its mower reel becomes overloaded. A clutch 59 is adapted to be adjusted to transmit a safe torque determined by strength of the drive cable 139. If the associated mower becomes accidentally overloaded its clutch 59 will slip at a torque below that which will destroy the cable 139. To prevent frequent slippage the clutch torque adjustment is preferably made to value higher than the average required mower torque but below the ultimate torsional strength of the cable 139. With an overload clutch 59 at the input end of the cable 139, the cable 139 will not rotate and flex under a relatively high slipping torque if the mower becomes obstructed. When placed at the output of a cable, an overload slip clutch would protect against excessive torque if a reel were jammed but would permit rotation and possible heavy wear under the relatively high slipping torque.

In addition to providing overload protection for their associated cables, the clutches 59 are adapted to be hydraulically engaged or disengaged to control mower operations. For considerations of safety and machine wear it is normally undesirable to drive the reel of a mower unit when it is retracted. It is desirable, from an operational standpoint, to provide a single control for each mower to operate both its lift actuator 19 and its drive clutch 59. Accordingly, we have provided in this invention an integrated system for simultaneously controlling both the lift actuators 19 and the drive clutches 59 of each mower unit 28, 30. Pressure within one of the five mower lift actuators 19 for mower retraction is hydraulically communicated to the clutch 59 of the associated mowing unit 28, 30 to disengage such clutch.

Figure 3:
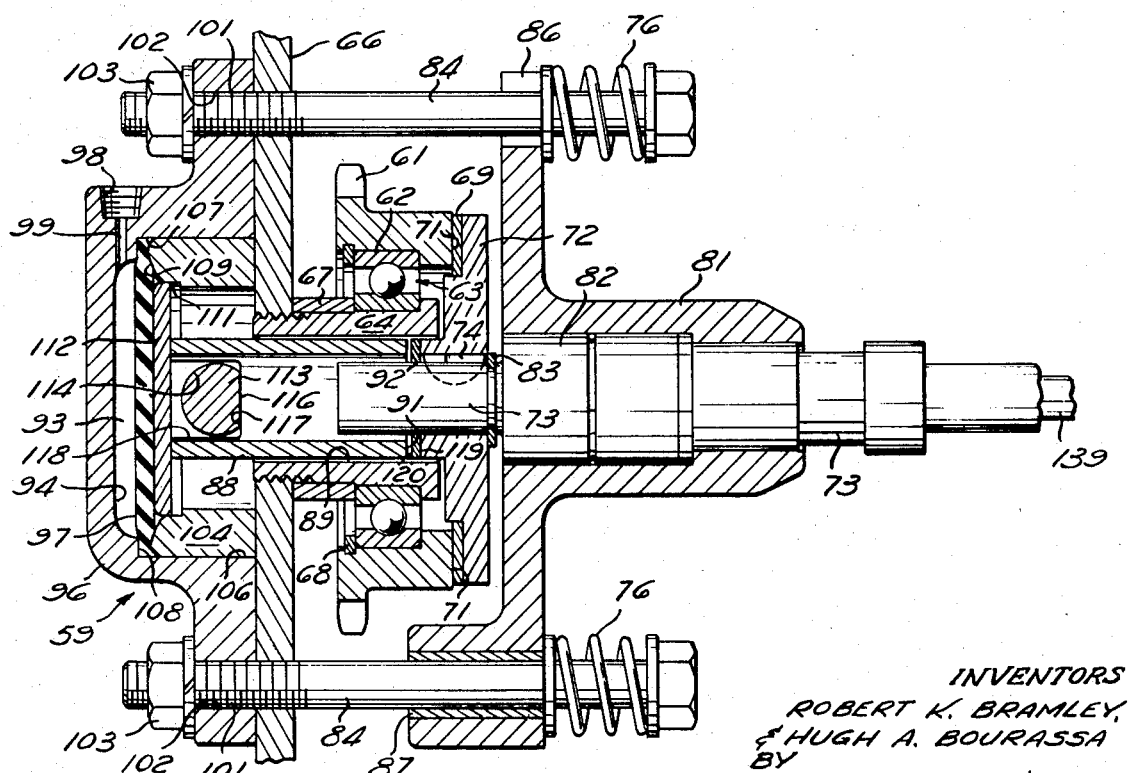
FIG. 3 is a cross-sectional view of one of the hydraulically operated slip clutches shown schematically in FIG. 2.

A typical cross-sectional view of one of the clutches 59 shown in FIG. 2 is shown in an enlarged scale in FIG. 3. A sprocket 61 is provided as the input member of the clutch assembly 59. This sprocket 61 is rotatably supported on the outer race 62 of a bearing 63 fixed to a hollow stud 64 threaded into a suitable mounting plate 66 carried by the mowing vehicle. The axial location of the bearing 63 and the stud 64 from the plate 66 is determined by the tubular spacer 67. The sprocket 61 is axially secured to the bearing 63 with an internal retaining ring 68. Power is transmitted through a friction lining disc 69 positioned between the sprocket hub face 71 and a power output disc 72. The output disc 72 is supported concentrically to the input sprocket 61 by an output shaft 73 to which it is locked by a key 74. The output disc 72 is axially loaded towards the sprocket 61 by two springs 76. These springs 76 normally provide the force which produces the driving connection between the input sprocket and output disc through the friction lining.

The spring load is transmitted to the output disc through the shaft housing 81 supporting the output shaft 73. The output shaft 73, journalled in a bearing 82 within the housing 81 further transmits the spring load from the housing 81 to the output disc 72. An external retaining ring 83 on the output shaft 73 transmits the axial spring load to the output disc 72.

The clutch spring load which determines the maximum torque transmitted to its cable 139 may be adjusted by turning in or backing out the bolts 84 which are threaded into the mounting plate 66. These bolts 84 besides compressing the springs 76 are arranged to locate the housing 81 and prevent it from rotating. This support by the bolts 84 is provided by a slot 86 and a bushing 87 within the housing 81.

The clutch 59 may be disengaged if the output disc 72 is moved away from the sprocket face 71. A tubular piston 88 provided for separating the output disc 72 from the sprocket face 71 is slidable within the bore 89 of the stud 64. One end 91 of the piston 88 extends over the output shaft 73 of the clutch 59 and terminates in its rest position short of contact with the spacer 92. The piston 88 may be driven towards the output disc hydraulically by pressurizing the chamber 93 formed by the circular recess 94 in the housing member 96 and the diaphragm 97. A tapped hole 98 and a passage 99 is provided in the housing 96 to admit pressurized fluid.

The housing 96 is positioned by the ends 101 of the bolts 84 which extend through the holes 102 in the housing 96; nuts 103 complete the mounting. Tightening these nuts 103 draws the housing 96 and diaphragm 97 against the mounting plate 66. A tubular spacer 104 is proportioned to fit into the housing bore 106 and seal the diaphragm 97 against the side walls 107 and end 108 of the bore 106. The tubular spacer 104 is provided with a tapered profile 109 along one end to effect this seal of the diaphragm 97 against the housing surfaces 107 and 108. An annular recess 111 is also provided in this spacer 104 to position a rigid circular plate 112 interposed between the diaphragm 97 and the clutch piston 88. The recess 111 is deep enough to allow the plate 112 to move under actuation of the diaphragm 97. As the chamber 93 is pressurized the diaphragm 97 and plate 112 drive the piston 88 against the spacer 92 moving the output disc 72 away from the input sprocket 61 to disengage the clutch 59.

Manual means for disengaging the clutch 59 is provided by rotation of a shaft 113. The shaft 113 is journalled in holes 114 drilled through the housing 96 transversely to the housing bore 106. A flat 116 on this shaft 113 is aligned with the surfaces 117 of the piston 88 when the clutch 59 is engaged. As the shaft 113 is rotated the piston is driven towards the output disc 72. The piston surfaces 117 are formed by a cross slot 118 cut into one end of the piston 88. The shaft 113 passing through the cross slot 118 of the piston 88 prevents the piston from rotating when it contacts the spacer 92 to disengage the output disc 72. The spacer 92 is preferably made of a wear-resistant material such as phenolic to provide braking surfaces 119 and 120 between the non-rotatable piston 88 and the output disc 72. The braking effect between the piston 88 and the output disc 72 upon disengagement of the clutch 59 is advantageous since it prevents free wheeling of a mower reel.

The clutch housing chamber 93 may be hydraulically connected to the actuating cylinder 19 of an associated mower 28, 30 thereby disengaging the clutch 59 whenever the cylinder 19 is pressurized for mower retraction. Furthermore, the clutch 59 will remain disengaged if the mower unit 28, 30 is hydraulically locked in its retracted position. The weight of each mower unit 28, 30 is sufficient to hold its actuator 19 pressurized and clutch 59 disengaged. Additionally, the hydraulic circuit and clutch 59 may be arranged to delay engagement of clutch 59 when the mower units 28, 30 are lowered. Preferably, the fluid exhausted from an actuator is sufficiently restricted by the hydraulic circuitry so that the weight of the mower units 28, 30 will maintain enough pressure in the circuit to hold a clutch 59 out of engagement until the mower 28, 30 is supported by the ground.

Figure 4:
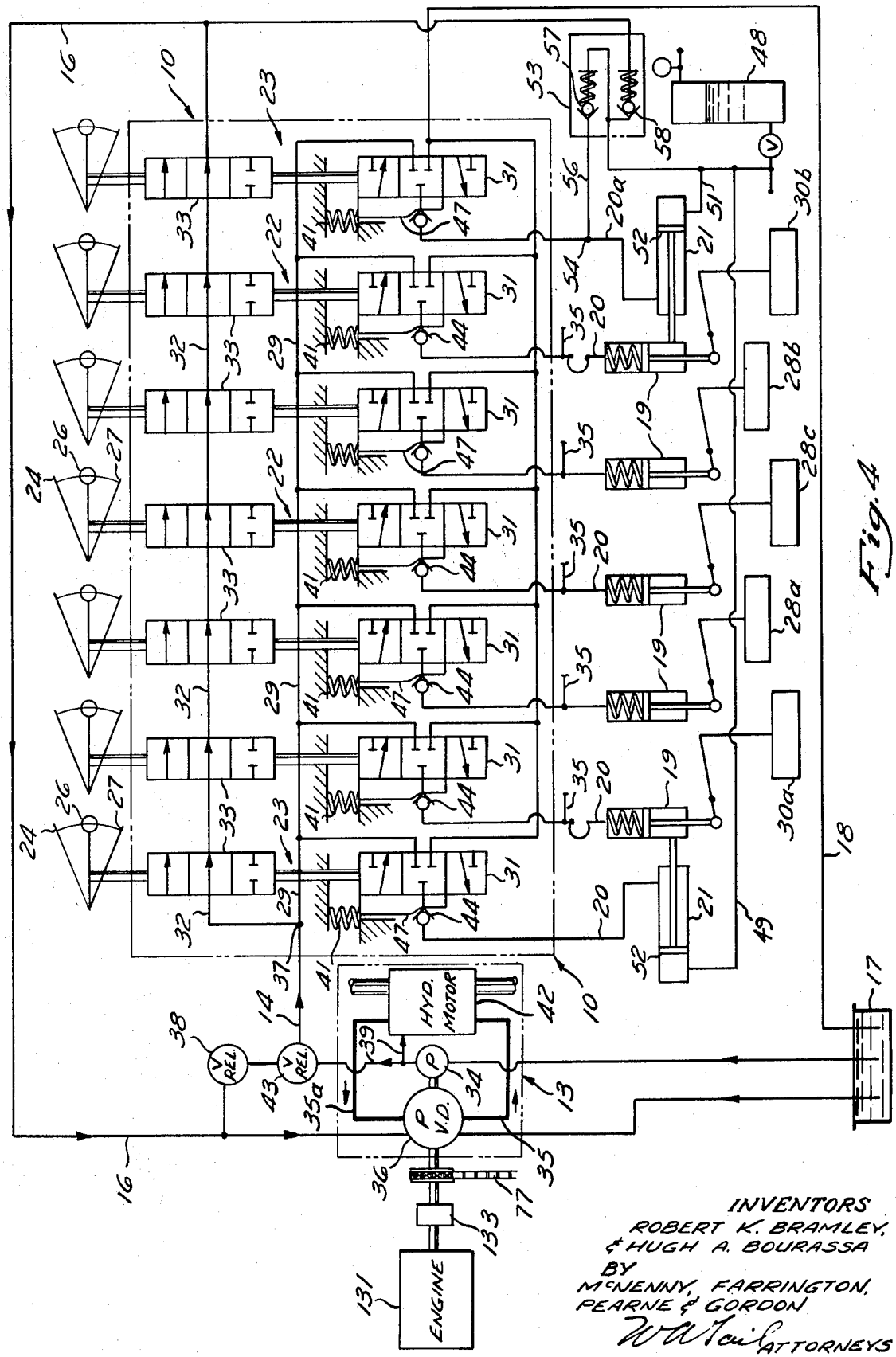
FIG. 4 is a schematic view of the valve assembly of this invention showing its relationship with the hydraulic vehicle drive and the hydraulic mower cylinders.

The transmission 13 of the vehicle 15 is shown schematically in FIG. 2 in relationship to the vehicle's engine 131 and the vehicle's front axle 149. The transmission is of the type manufactured by Sundstrand Corporation of LaSalle, Illinois under the trademark Hydrogear. The transmission driven by the engine 131 comprises a variable displacement pump which drives a fixed displacement hydraulic motor connected directly to the front axles 149 of the vehicle. Vehicle speed may be regulated with a given engine speed by selection of an appropriate pump displacement setting. The internal hydraulic circuitry of this transmission system 13 is schematically shown in FIG. 4. The variable displacement pump 36 is seen connected to the fixed displacement hydraulic motor 42 by the primary transmission lines 35, 35a. Also driven by the engine 131 is the fixed displacement make-up charge pump 34 servicing the hydraulic motor 42 through lines 39. A relief valve 43 is provided to maintain this charge circuit 39 of the transmission 13 at a normal or idle pressure of about 75 p.s.i. The charge pump 34 is adapted to intermittently drive hydraulic implements of the vehicle at a pressure higher than this normal or idling charge pressure.

The valve assembly 10 of this invention is schematically represented in FIG. 4 and is shown connected to the relief valve 43 by the hydraulic line 14. The actual control valve assembly 10 may be positioned on the vehicle 15 for convenient operator control as shown in FIG. 1. The valve assembly 10 is also connected hydraulically to the transmission 13 by the return line 16. A secondary return route 18 is likewise provided to return fluid from the valve assembly 10 to a reservoir 17 of the vehicle 15. Five mower lift actuators 19 and two horizontal position actuators 21 are also shown connected to the valve assembly 10 by means of lines 20 and 20a. Valve spool assemblies 22, 23 have three control positions for driving, locking, and exhausting each actuator cylinder. With reference to the lifting actuators 19, these respective positions represent mower lift 24, mower actuator locking 26, usually with the mower unit in its fully retracted position, and finally, mower extension and float 27 for mower operation.

Hydraulic fluid is supplied to a channel 32 of the valve assembly 10 through line 14 from the auxiliary charge pump 34 of the transmission 13. Each spool valve assembly 22, 23 is shown with two separate spools 31 and 33 to clarify the function of the assembly. The series path of the channel 32 through each upper spool 33 of the valve assembly 10 serves as a bypass for fluid from the charge pump 34. The path is unobstructed with the indicated positions 26 of the valves. Fluid returns from the channel 32 through the line 16 and the casing of the main pump 36 to the reservoir 17; return pressure in these enclosures normally approaches atmospheric pressure. It can be seen that the channels 29 and 32 which represent the interior of the valve assembly 10 are connected at the junction 37. Therefore, the valve assembly 10 is at the near atmospheric pressure of the casing of the main pump 36 when all of the valves 22, 23 are in the position 26 shown. Moving any spool valve assembly 22, 23 upwards to operate a mower actuator 19, 21 blocks the free flow of fluid through its upper spool 33 but allows fluid to flow through a common hydraulic channel 29 to its lower spool 31 into its associated actuator. The positive displacement auxiliary pump 34, since the normal bypass circuit 32 through the upper valve spool 33 is blocked, increases the hydraulic pressure in the system to drive an actuator 19, 21. Hydraulic pressure developed by the auxiliary charge pump 34 is limited normally to about 350 p.s.i. determined by the relief valve 38 which exhausts excess fluid to the main pump 36.

Each spool valve 22, 23 is connected to its associated actuator cylinder by its individual hydraulic line 20, 20a. The lines 20 from the five spool valves 22, adapted to drive the five lifting actuators 19 may be provided with T-fittings or the like to join lines 35 (partially shown in FIG. 4) which are connected to the hydraulic passage 99 and chamber 93 of the associated mower clutch 59. Thus, pressure in a hydraulic actuator is communicated to the associated clutch to disengage it.

Operation of one of the control valves 22 to lift a mower 28, 30 as mentioned, closes the free path 32 from the auxiliary or charge pump 34 through the control valve assembly 10. Hydraulic pressure in the control valve assembly 10 and the charge circuit 39 of the transmission 13 thereby increases to a safe elevated pressure limited by the relief valve 38 for intermittent operation of the implements 19, 21. Since extended operation of the charge pump 34 at this elevated pressure might result in the generation of excessive heat, individual valve assemblies 22, 23 are provided with a spring member 41 urging each control valve 22, 23 out of its upper driving position 24 to prevent an operator from inadvertently leaving a valve 22, 23 in this raised position 24.

Release of the control valve handle 46 permits the spool valve assembly 22, 23 to return by means of its spring 41 to its mid position 26 thereby reducing the control valve assembly pressure to its idling point. Simultaneously, the mower 28, 30 is automatically locked in its retracted position by seating of an integral check valve 44 which normally prevents any flow out of the mower actuator 19, 21. The pressure required to hold a mower 28, 30 in its retracted position is supported by the non-leaking integral check valve 44. Thus, the actual spools of the control valves 22, 23 are subject to a high pressure only intermittently when an actuator 19, 21 is being energized. As a result the spool valves 22, 23 of the control assembly 10 may be made inexpensively with relatively loose tolerances.

The control valves 22, 23 of the assembly 10 are provided with camming surfaces 47 which unseat their associated check valves 44 when such valves are in their lower position 27. To permit a mower unit 28, 30 to extend downward towards its mowing position, the spool valve assembly 22 is thus lowered. This allows hydraulic fluid under the weight of the mower unit 28, 30 to escape from the associated actuator 19 through the hydraulic lines 20, the lower spool 31, and line 18 to the reservoir 17 permitting the mower 28, 30 to extend. During mowing operations fluid flows in and out of the check valve 44 enabling a mower unit 28, 30 to rise and fall with the terrain. Accordingly, the spool valve assemblies 22 and integral cams 47 are adapted to remain in a downward position 27 unaffected by the springs 41. It should be noted that when a spool valve assembly 22, 23 is in its downward position 27 flow through the upper spools 33 and the channel 32 continues, maintaining the near atmospheric pressure of the transmission casing in the control valve assembly 10.

The individual spool control valves 22, 23 of the control valve assembly 10 in FIG. 4 are shown schematically as two connected spools 31 and 33 for the purpose of illustration. In practice these valves would normally be of a unitary design. It should be understood that more suitable arrangements might also be adapted for rotary actuation. Furthermore, it should be understood that this invention is not limited to the use of a hydraulic transmission having an integral implement circuit. Many of the inventive concepts disclosed herein may utilize external auxiliary hydraulic power sources.

As shown in FIG. 1 and our copending application cited above, the mower of this invention is provided with five mowing units 28, 30 each adapted to be raised with hydraulic actuators 19. In addition to the lifting actuators 19, two horizontal actuators 21 are provided herein to horizontally position the two outboard mowers 30a, 30b. Because an operator's perception of clearance becomes less accurate with distance these outside mowers 30 may encounter a relatively higher number of obstacles. It is therefore desirable to yieldably support them in their horizontal extended position. This is accomplished according to this invention by horizontally positioning the mowers 30 with these bidirectional actuating cylinders 21 and an accumulator 48 continuously urging the mowing units 30 into a forward position.

FIG. 4 shows the accumulator 48 connected to the horizontal actuators 21 by the hydraulic lines 49 and 51. The accumulator 48 in addition to storing the energy to extend the mower units 21, provides a desired spring-like forward support. The mower units 21 my be retracted horizontally by driving the bidirectional cylinders 21 rearwardly through a spool control valve assembly 23 identical to the valve 22 for unidirectional lifting actuators 19. The bidirectional cylinders 21 are designed to provide a sufficient extension force for proper mowing with an accumulator pressure ranging between about 225–260 p.s.i. and less than the actuating pressure developed by the charge pump 34 which is normally limited to about 350 p.s.i. When an outboard control valve 23 is raised, the actuating pressures opposes the lower accumulator pressure and the net pressure difference drives an outboard mower unit 30 rearwardly to its retracted position. Once the mower is driven rearwardly, it is hydraulically locked until the associated valve is moved to the position 27. With the spool control valve 23 in its lower position 27, the mower unit 30 is driven forward with the full accumulator pressure. The spool control valve 23 in this position 27 applies no pressure to the actuator 21 and unseats the check valve 44 to exhaust the fluid from the actuator 21. This lower position 27 of the valve 23 corresponds to the mower float positions 27 of the other spool valve assemblies 22 for mowing and allows the outboard mower 30 to yield when it encounters an obstacle.

A double relief valve arrangement 53 is provided to control the pressure and to replenish the fluid supply in the accumulator system 48. As seen in FIG. 4 the accumulator 48 is connected to an end of both horizontal position actuators 21 by the hydraulic lines 49 and 52. Additionally, the relief valve system 53 connects the accumulator system 48 to a convenient fluid source at the junction 54 between the hydraulic line 20a and hydraulic line 56. When the pressure in the line 20a exceeds the setting of the relief valve 57 at about 340 p.s.i., as the associated control valve 23 is raised, fluid passes through the line 56 into the accumulator system 48.

This flow continues until the accumulator 48 is properly filled and its pressure exceeds the setting of the other relief valve 58, usually at about 260 p.s.i. The flow is then exhausted by this valve 58 to the transmission casing through the line 16. Normal fluid leakage from the accumulator system 48 and horizontal actuators 21 is thus replaced whenever the associated outboard spool valve 23 is raised.

OPERATION

The engine 131 of the vehicle may be started without driving the transmission 13 and cable drive system 132 since the centrifugal clutch 133 will not transmit power to these systems until the engine is run above a predetermined minimum speed. The mower units 28a, 28b, 28c, 30a and 30b may be extended individually by lowering their associated spool control valves 22, 23 whether or not the engine 131 is running. The vehicle 15 may be moved when engine speed in increased to engage the centrifugal clutch 133. If the hydraulic transmission displacement setting is other than zero the vehicle will move simultaneously with the engagement of the centrifugal clutch 133. Otherwise, it will move when the transmission is moved out of its neutral setting.

If the mowing units 28, 30 are still retracted when the centrifugal clutch 133 is engaged, the individual mower clutches 59 will not transmit power to the reels of the mowing units since the associated lifting actuators 19 are pressurized under the weight of their mowers. Furthermore, the hydraulic circuitry is sufficiently restricted to hold these clutches 59 out of engagement while their associated mowing units 28, 30 are being extended by exhausting their individual lifting actuators 19. During mowing operations any combination of mower units may be extended into their mowing positions by depressing the corresponding combination of spool control valves 22, 23 from their mid position 26. As the vehicle moves along, the spool control valves 22 in their lower position 27 allow their associated mowers 28, 30 to float vertically with the contour of the area being mowed while the associated cables 139 assure positive reel drive. If an outboard mowing unit, supported in its forward extended position by an associated hydraulic actuator 21 and accumulator 48, encounters an obstacle it may yield rearwardly until the operator circumvents the obstacle. If the reel of a mowing unit 28, 30 is obstructed by foreign material its associated drive clutch 59 will slip to protect its drive cable 139.

Each mower unit may be retracted to provide access to a confined mowing area, to facilitate mower vehicle transport, or to provide access to a small parking area. To retract a mower 28, 30 a spool control valve 22, 23 is raised to its upward position 24. Motion of such control valve blocks the bypass circuit 32 connected to the integral implement circuit of the vehicle's hydraulic transmission 13. Flow is simultaneously directed into the associated hydraulic actuator 19, 21 to effect the mower retraction. Pressurization of the hydraulic actuator is communicated to the drive clutch 59 to hydraulically disengage it. These clutches 59 remain disengaged as long as their associated hydraulic actuators are locked in their retracted positions by the associated check valves 44.

In summary, a hydraulically operated clutch is provided to transmit power to the mower units of the vehicle. These five clutches are separately connected to the hydraulic control circuit to disengage whenever an associated lifting actuator is pressurized. The clutches, in addition to providing integrated operator control of mower lift and drive, are also adapted to automatically protect their driven cables by slipping in the event of a mower overload.

A mowing vehicle is provided with a hydraulic transmission having an integral implement circuit. The control valve assembly of this invention permits the mower control circuit including both the integral transmission implement circuit and the valve assembly itself to idle at reduced pressures. Operation of any of the seven spool valves of the valve assembly to energize a mower actuator causes the control circuit pressure to increase to an elevated value for intermittent operation.

An accumulator system and bidirectional actuators are provided to horizontally position two outboard mower units. The accumulator and actuator combination provides a spring-like forward extension of these mower units. An encounter with an obstacle during operation of one of these outboard mowers is accommodated by the accumulator system. Furthermore, the bidirectional actuators and accumulator are adapted to retract under the control of individual spool valves identical to those in the valve assembly operating unidirectional actuators.

Although a preferred embodiment of this invention is illustrated, it is to be understood that various modifications and rearrangements of parts may be resorted to without departing from the scope of the invention disclosed.

What is claimed is:

1. A power mower comprising a wheeled vehicle having a power unit operable to drive the vehicle, a mower unit supported on said vehicle, said mower unit being movable between an operative generally horizontal position and a retracted position, a drive coupling between said power unit and said mower unit, a fluid motor connected to move said mower unit from its operative position when pressurized, and a pressure sensitive device in communication with said fluid motor causing disengagement of said coupling in response to fluid pressurization of said motor.

2. A power mower as set forth in claim 1 wherein said drive coupling is operable to limit the torque transmitted to said mower unit to a predetermined maximum torque.

3. A power mower as set forth in claim 1 wherein manual means are provided to permit manual disengagement of said coupling independent of the position of said mower unit.

4. A power mower comprising a wheeled vehicle having a power unit operable to drive the vehicle, a mower unit supported on said vehicle, said mower unit being movable between an operative generally horizontal position and a retracted position, said mower unit when in said operative position being supported for substantially free vertical and tipping movement with respect to said vehicle, a flexible cable drive connected between said power unit and mower unit, said flexible cable drive permitting said movement of said mower unit without being disconnected, and a torque limiting device connected between said power unit and said flexible cable drive.

5. A power mower comprising a wheeled vehicle having a power unit operable to drive the vehicle, a mower unit supported on said vehicle, said mower unit being movable between an operative generally horizontal position and a retracted position, said power unit including a hydraulic power system capable of operating at a reduced pressure, a hydraulic motor operable to position said mower unit, and valve means connected between said hydraulic system and hydraulic motor to control said hydraulic motor, said valve means operating to automatically increase the pressure in said power system when retracting said mower.

6. A power mower as set forth in claim 5 wherein said power mower includes a plurality of mower units each provided with an associated hydraulic motor, said valve means including a valve for each hydraulic motor, said valves being connected in series, operation of any of said valves increasing the pressure of the hydraulic power system from said reduced pressure.

7. A power mower as set forth in claim 5 wherein a hydraulic extension means is operable to provide movement from said retracted position toward said operative position, said hydraulic extension means including a resilient means operable to allow said mower to move rearwardly when it encounters an obstacle.

8. A power mower as set forth in claim 7 wherein said hydraulic extension means includes a hydraulic piston and cylinder actuator and a hydraulic accumulator adapted to operate said actuator to yieldably extend said mower unit forwardly.

9. A power mower comprising a wheeled vehicle having a power unit operable to drive said vehicle, said power unit including pump means operable to provide a source of fluid under pressure, a plurality of mower units each mounted on said vehicle for movement between an operative position and a retracted non-operative position, a hydraulic motor associated with each mower unit operable to move its associated mower unit between operative and retracted positions, a flexible cable drive associated with each mower unit operable to connect and drive its associated mower unit from said power unit, each cable drive including torque limiting means which slip when its associated mower unit is jammed, each cable drive also including a hydraulic clutch operable to selectively connect and disengage each cable drive, and valve means connected to said source and associated with each mower unit operative to control each associated hydraulic motor and associated hydraulic clutch so that each associated clutch connects said power unit to the associated mower unit only when such mower unit is in its operative position.

10. A power mower as set forth in claim 9 wherein each valve means is operable to disconnect its associated hydraulic motor from said source and hydraulically lock its associated mower in said retracted position.

11. A power mower as set forth in claim 10 wherein said mowers maintain sufficient pressure in their associated hydraulic motor when they are hydraulically locked in said retracted position to maintain the associated clutch disengaged.

12. A power mower as set forth in claim 11 wherein each flexible cable drive includes a flexible cable and said torque limiting means are located between said power unit and its associated flexible cable.

13. A power mower as set forth in claim 12 wherein said hydraulic clutch and said torque limiting means is a single unit.

References Cited

UNITED STATES PATENTS

| | | | |
|---|---|---|---|
| 2,145,467 | 1/1939 | Waddell | 56—7 |
| 2,325,252 | 7/1943 | Krenzke | 56—7 |
| 2,764,864 | 10/1956 | Kinkead | 56—7 |
| 3,058,281 | 10/1962 | Lewis | 56—7 |

LOUIS G. MANCENE, Primary Examiner

J. A. OLIFF, Assistant Examiner

U.S. Cl. X.R.

56—26; 60—51; 192—88